US012561792B2

(12) United States Patent
Han et al.

(10) Patent No.: US 12,561,792 B2
(45) Date of Patent: Feb. 24, 2026

(54) WELDING DEFECT DETECTION METHOD AND APPARATUS, STORAGE MEDIUM, AND PROGRAM PRODUCT

(71) Applicant: CONTEMPORARY AMPEREX TECHNOLOGY CO., LIMITED, Ningde (CN)

(72) Inventors: Donglu Han, Ningde (CN); Lin Ma, Ningde (CN); Pengfei Meng, Ningde (CN); Zerong Cao, Ningde (CN); Zhipeng Chen, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/223,142

(22) Filed: May 30, 2025

(65) Prior Publication Data

US 2025/0292387 A1    Sep. 18, 2025

Related U.S. Application Data

(63) Continuation of application No. PCT/CN2024/079760, filed on Mar. 1, 2024.

(30) Foreign Application Priority Data

Nov. 20, 2023    (CN) .......................... 202311543281.0

(51) Int. Cl.
*G06T 7/12* (2017.01)
*G06T 7/00* (2017.01)

(52) U.S. Cl.
CPC .............. *G06T 7/0004* (2013.01); *G06T 7/12* (2017.01); *G06T 2207/20021* (2013.01); *G06T 2207/30136* (2013.01)

(58) Field of Classification Search
CPC ..................... G06T 7/0004; G06T 7/12; G06T 2207/20021; G06T 2207/30136
(Continued)

(56) References Cited

U.S. PATENT DOCUMENTS

2006/0067571 A1    3/2006    Onishi
2018/0015571 A1    1/2018    Wang et al.

FOREIGN PATENT DOCUMENTS

CN        113610814 A    11/2021
CN        113989232 A     1/2022
CN        115100127 A     9/2022
CN        115147370 A    10/2022
(Continued)

OTHER PUBLICATIONS

International Search Report in the international application No. PCT/CN2024/079760, mailed on Jul. 23, 2024. 6 pages with English translation.
(Continued)

*Primary Examiner* — Sheela C Chawan
(74) *Attorney, Agent, or Firm* — K&L Gates LLP

(57) ABSTRACT

The present application provides a welding defect detection method and apparatus, a storage medium, and a program product, and relates to the field of batteries. A weld region and non-weld regions are obtained by using a first image having structural information, a plurality of detection regions of a weld are obtained according to the weld region and the non-weld regions, and it is determined that the weld has a defect when preset attribute information of at least one detection region in the plurality of detection regions of the weld satisfies a preset condition.

19 Claims, 7 Drawing Sheets

Obtain a first image of welding between a battery top cover and a case, where the first image includes structural information — 110

Perform weld region detection in the first image, to obtain a weld region and non-weld regions — 120

Determine a plurality of detection regions of a weld between the battery top cover and the case according to the weld region and the non-weld regions — 130

Determine that the weld has a defect when preset attribute information of at least one detection region in the plurality of detection regions of the weld satisfies a preset condition — 140

(58) Field of Classification Search
USPC ................................................ 382/100, 141
See application file for complete search history.

(56)                    References Cited

FOREIGN PATENT DOCUMENTS

| CN | 115619734 A | 1/2023 |
| CN | 116087205 A | 5/2023 |
| CN | 116228640 A | 6/2023 |
| CN | 116309576 A | 6/2023 |
| CN | 116337871 A | 6/2023 |
| CN | 116309576 B | 9/2023 |
| CN | 116703883 A | 9/2023 |
| CN | 116818811 A | 9/2023 |
| CN | 116823756 A | 9/2023 |
| CN | 117054334 A | 11/2023 |
| CN | 117252883 A | 12/2023 |
| NO | 784224 L | 7/1979 |
| WO | 2023087741 A1 | 5/2023 |

OTHER PUBLICATIONS

Written Opinion of the International Search Authority in the international application No. PCT/CN2024/079760, mailed on Jul. 23, 2024. 10 pages with English translation.

Notification of Examination Opinion on Request for Expedited Pre-Examination regarding Chinese Application No. 202311543281.0, issued on Nov. 15, 2023. 8 pages with English translation.

First Office Action of the Chinese application No. 202311543281.0, issued on Dec. 25, 2023. 25 pages with English translation.

Notice of Allowance of the Chinese application No. 202311543281.0, issued on Jan. 10, 2024. 7 pages with English translation.

"The general table of contents of Issues 1 to 12 of Journal of Mechanical Engineering in 2007", Chinese Journal of Mechanical Engineering, vol. 43 No. 12, Dec. 2007, pp. 1-35.

Liu Hui, Wan Wen, Xiong Zhenyu, "Defect detection and recognition technology of X ray weld image", Electric Welding Machine, vol. 47 No. 4, Apr. 2017, pp. 1-5.

Supplementary European Search Report in the European application No. 24892610.7, mailed on Dec. 12, 2025.

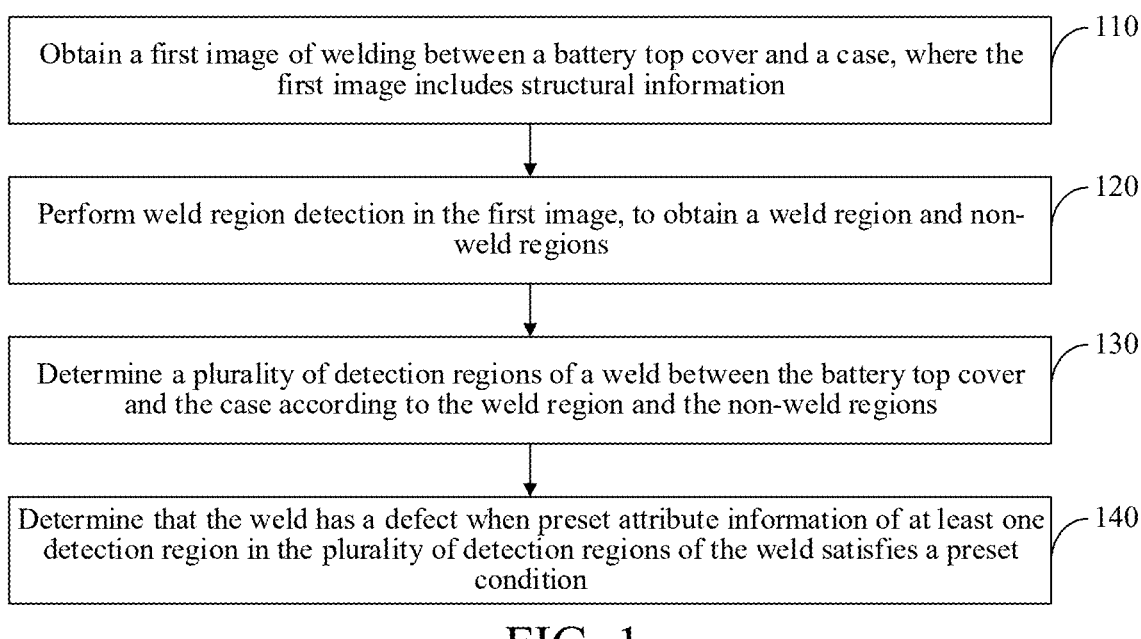

Obtain a first image of welding between a battery top cover and a case, where the first image includes structural information `110`

Perform weld region detection in the first image, to obtain a weld region and non-weld regions `120`

Determine a plurality of detection regions of a weld between the battery top cover and the case according to the weld region and the non-weld regions `130`

Determine that the weld has a defect when preset attribute information of at least one detection region in the plurality of detection regions of the weld satisfies a preset condition `140`

FIG. 1

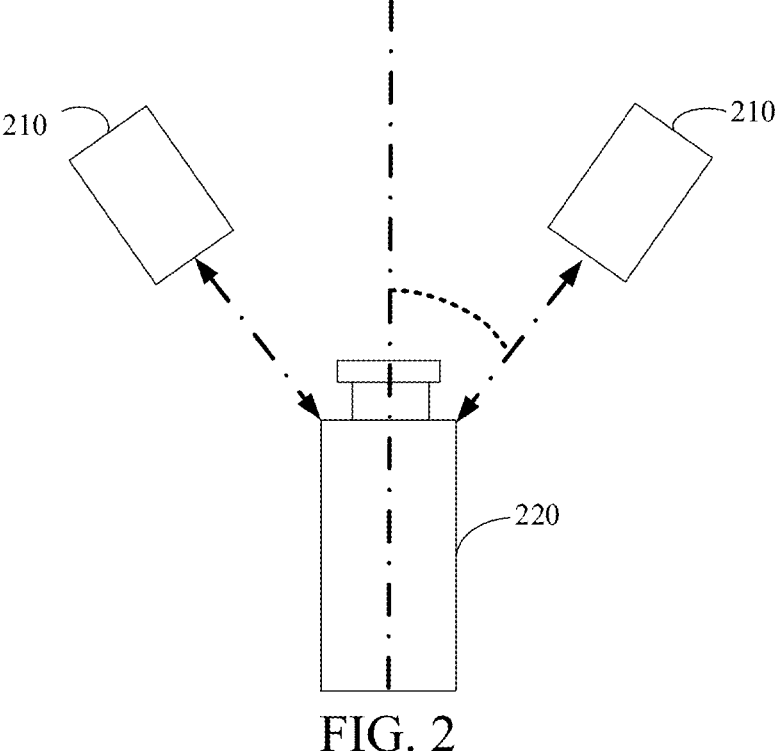

FIG. 2

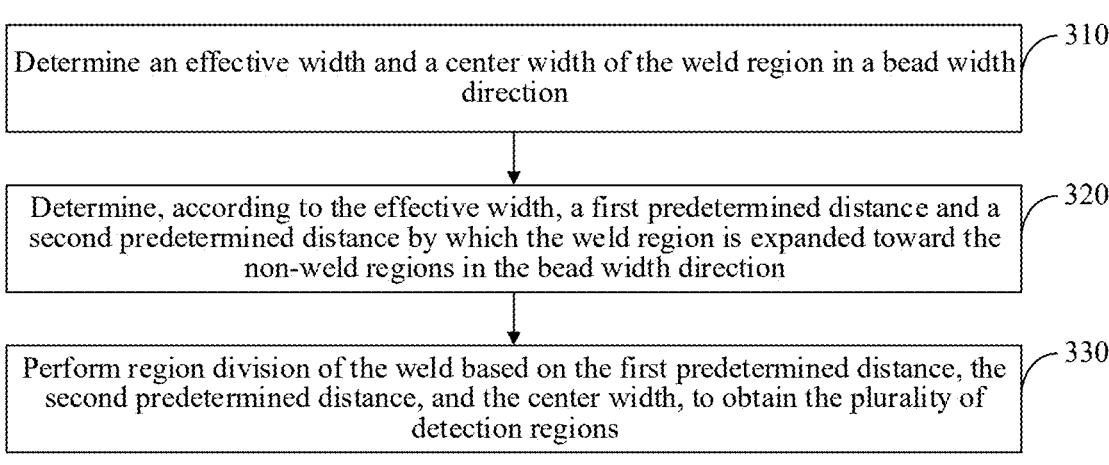

| Determine an effective width and a center width of the weld region in a bead width direction | 310 |

↓

| Determine, according to the effective width, a first predetermined distance and a second predetermined distance by which the weld region is expanded toward the non-weld regions in the bead width direction | 320 |

↓

| Perform region division of the weld based on the first predetermined distance, the second predetermined distance, and the center width, to obtain the plurality of detection regions | 330 |

FIG. 3

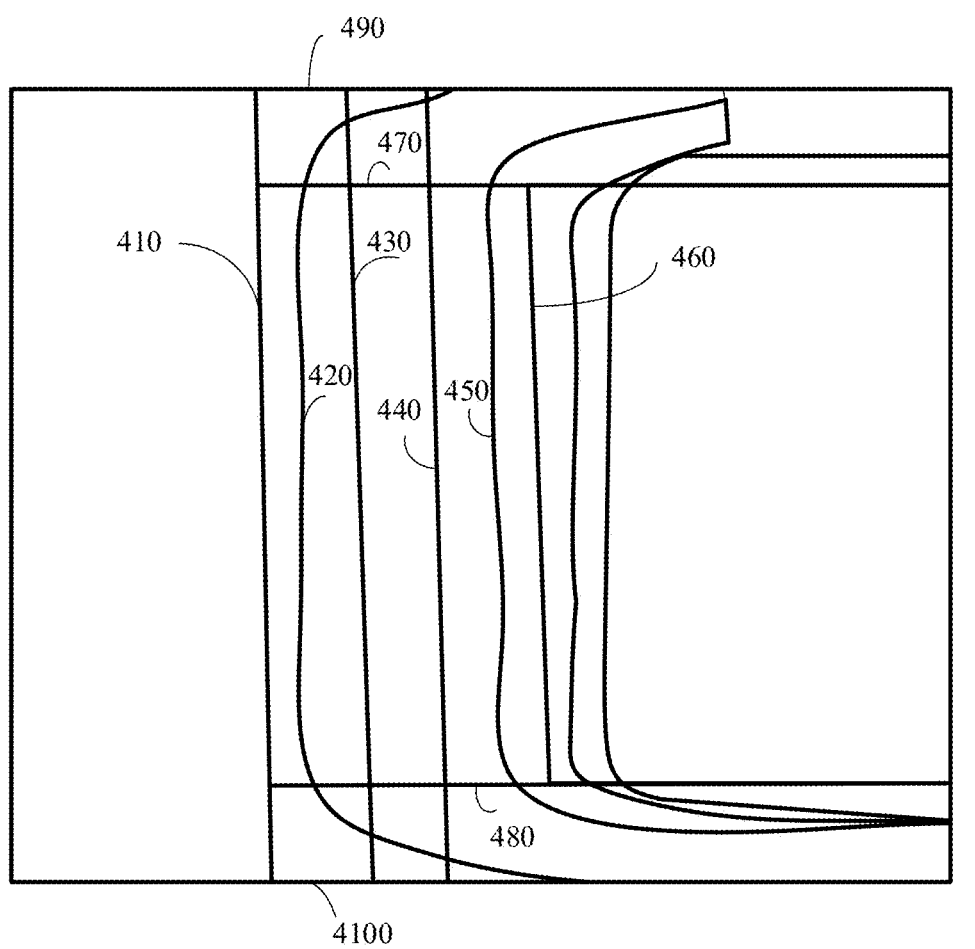

FIG. 4

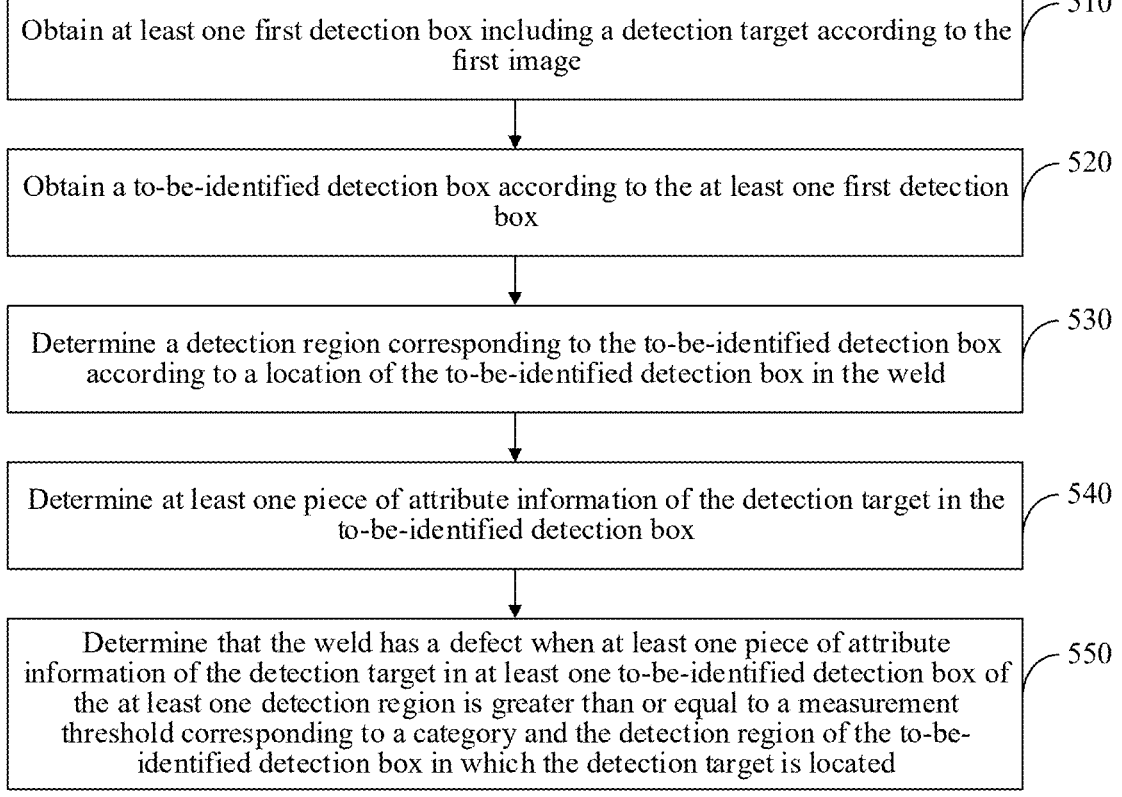

Obtain at least one first detection box including a detection target according to the first image — 510

Obtain a to-be-identified detection box according to the at least one first detection box — 520

Determine a detection region corresponding to the to-be-identified detection box according to a location of the to-be-identified detection box in the weld — 530

Determine at least one piece of attribute information of the detection target in the to-be-identified detection box — 540

Determine that the weld has a defect when at least one piece of attribute information of the detection target in at least one to-be-identified detection box of the at least one detection region is greater than or equal to a measurement threshold corresponding to a category and the detection region of the to-be-identified detection box in which the detection target is located — 550

FIG. 5

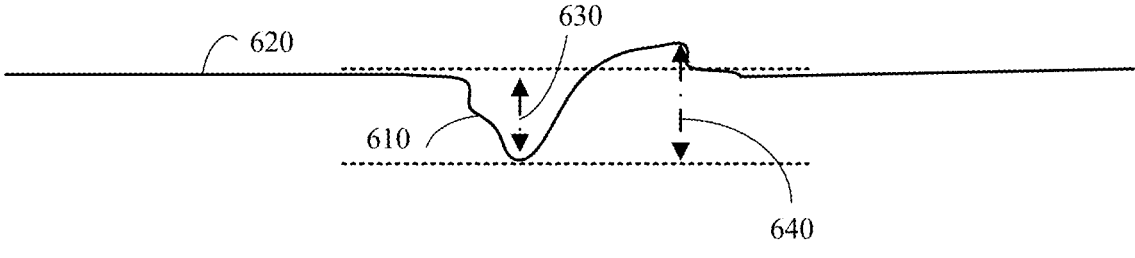

FIG. 6

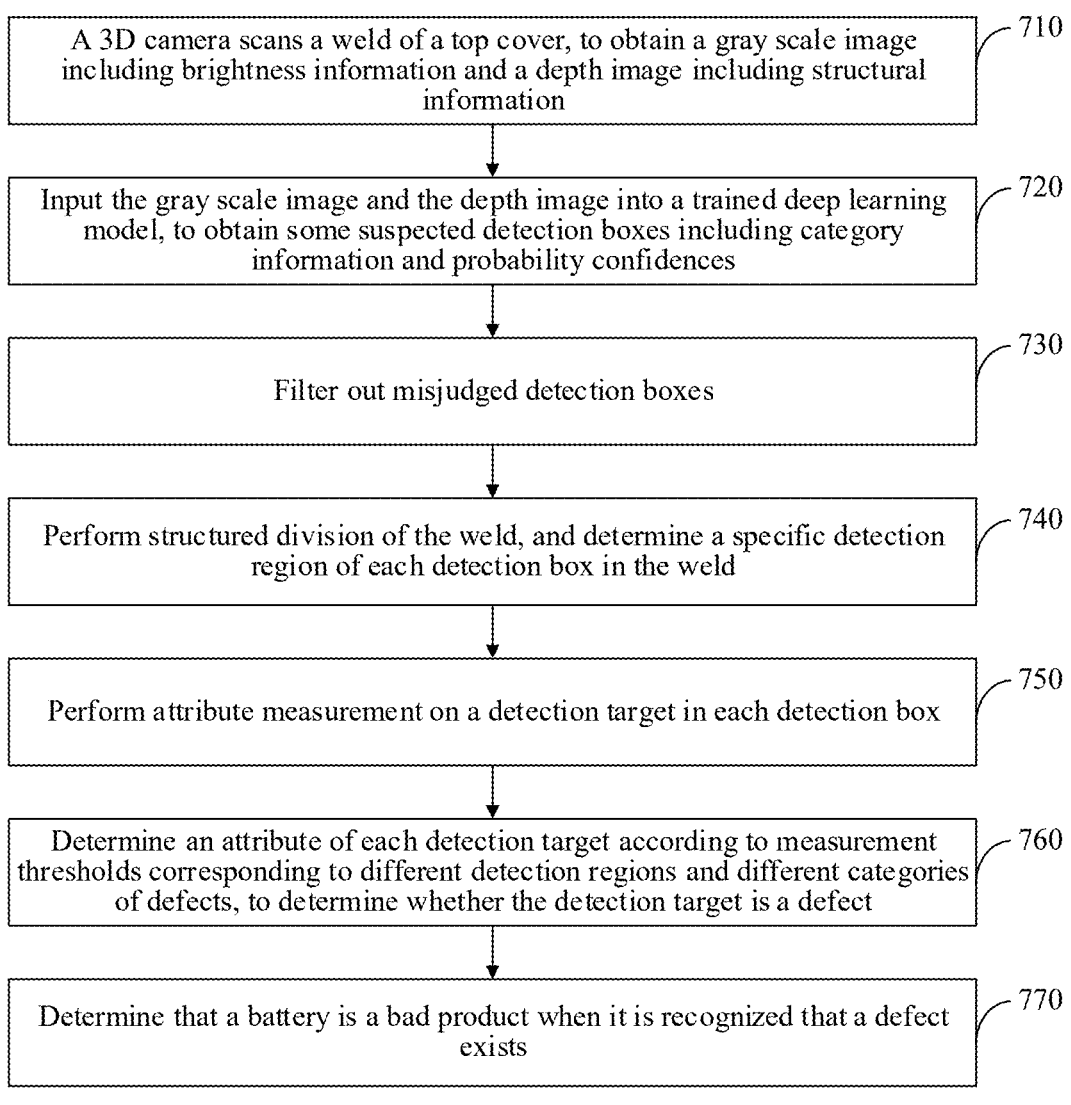

A 3D camera scans a weld of a top cover, to obtain a gray scale image including brightness information and a depth image including structural information ⟍710

Input the gray scale image and the depth image into a trained deep learning model, to obtain some suspected detection boxes including category information and probability confidences ⟍720

Filter out misjudged detection boxes ⟍730

Perform structured division of the weld, and determine a specific detection region of each detection box in the weld ⟍740

Perform attribute measurement on a detection target in each detection box ⟍750

Determine an attribute of each detection target according to measurement thresholds corresponding to different detection regions and different categories of defects, to determine whether the detection target is a defect ⟍760

Determine that a battery is a bad product when it is recognized that a defect exists ⟍770

FIG. 7

WELDING DEFECT DETECTION METHOD AND APPARATUS, STORAGE MEDIUM, AND PROGRAM PRODUCT

CROSS-REFERENCE TO RELATED APPLICATIONS

The present disclosure is a continuation of International Application No. PCT/CN2024/079760, filed on Mar. 1, 2024, which claims priority to Chinese Patent Application No. 202311543281.0, filed with the China National Intellectual Property Administration on Nov. 20, 2023 and entitled "WELDING DEFECT DETECTION METHOD AND APPARATUS, AND STORAGE MEDIUM", which is incorporated herein by reference in its entirety.

TECHNICAL FIELD

The present application relates to, but is not limited to, the field of batteries, and in particular, to a welding defect detection method and apparatus, a storage medium, and a program product.

BACKGROUND

During production of a power lithium battery, due to different material compositions of a top cover and an aluminum case and divergent impact of a device welding laser, some defects occur in welding between a battery cell and the top cover. In consideration of the production yield, the delivery rate, and the safety of the battery cell, detection on a weld for welding of the top cover becomes an indispensable part.

In the related art, weld defect detection is performed by directly positioning a defect location and outputting a result, resulting in a high misjudgment rate.

The foregoing statement is only intended to provide background information related to the present application, and does not necessarily constitute the related art.

SUMMARY

A technical problem to be resolved in the present application is to provide a welding defect detection method and apparatus, a storage medium, and a program product, which can reduce a misjudgment rate of weld defect detection.

According to a first aspect, the present application provides a welding defect detection method, including: obtaining a first image of welding between a battery top cover and a case, where the first image includes structural information; performing weld region detection in the first image, to obtain a weld region and non-weld regions; determining an effective width and a center width of the weld region in a bead width direction; determining, according to the effective width, a first predetermined distance and a second predetermined distance by which the weld region is expanded toward the non-weld regions in the bead width direction; performing region division of a weld between the battery top cover and the case based on the first predetermined distance, the second predetermined distance, and the center width, to obtain a plurality of detection regions; and determining that the weld has a defect when preset attribute information of at least one detection region in the plurality of detection regions of the weld satisfies a preset condition.

In the technical solution of embodiments of the present application, region division is performed in an image to clearly determine a weld region of interest and non-weld regions, and then a weld structure is refined to obtain a plurality of detection regions, thereby facilitating subsequent independent defect determining for each region, and improving accuracy of identifying a weld defect. In addition, when preset attribute information of at least one detection region satisfies the preset condition, it is determined that the weld has a defect. Through region analysis and specification control, when the weld defect is effectively intercepted, a misjudgment rate of the weld defect can be reduced, and detection accuracy can be improved, thereby improving the battery yield and the delivery volume.

In some embodiments, the determining an effective width of the weld region in a bead width direction includes: determining a first edge location and a second edge location of the weld region in the bead width direction; and obtaining the effective width of the weld region in the bead width direction according to a difference between the second edge location and the first edge location. The effective width of the weld region is determined, thereby facilitating division of the weld structure.

In some embodiments, the plurality of detection regions include an upper top cover weld region, a center bead region, and a side top cover weld region, where the center bead region is located between the upper top cover weld region and the side top cover weld region in the bead width direction; and the performing region division of a weld between the battery top cover and the case based on the first predetermined distance, the second predetermined distance, and the center width, to obtain a plurality of detection regions includes: determining a third edge location and a fourth edge location of the center bead region in the bead width direction according to the first edge location, the second edge location, the effective width, and the center width of the weld region in the bead width direction; expanding, in the bead width direction, the first edge location by the first predetermined distance toward a non-weld region in a direction away from the center bead region, to obtain a fifth edge location of the upper top cover weld region in the bead width direction, where the third edge location is an edge location of the upper top cover weld region close to the center bead region in the bead width direction; and expanding, in the bead width direction, the second edge location by the second predetermined distance toward a non-weld region in the direction away from the center bead region, to obtain a sixth edge location of the side top cover weld region in the bead width direction, where the fourth edge location is an edge location of the side top cover weld region close to the center bead region in the bead width direction. The weld is divided into the upper top cover weld region, the center bead region, and the side top cover weld region, which is conducive to formulating independent defect measurement criteria for different weld regions on a production line, thereby reducing the misjudgment rate of the weld defect.

In some embodiments, the determining a third edge location and a fourth edge location of the center bead region in the bead width direction according to the first edge location, the second edge location, the effective width, and the center width of the weld region in the bead width direction includes: moving the first edge location by a third predetermined distance toward the second edge location, to obtain the third edge location, where the third predetermined distance is half a difference between the effective width and the center width; and moving the second edge location by the third predetermined distance toward the first edge location, to obtain the fourth edge location. The center bead region is identified, and the edge locations of the center bead region are determined, so that accuracy of weld division can be improved.

In some embodiments, the plurality of detection regions further include a first detection region and a second detection region, where the first detection region is located on first sides of the upper top cover weld region, the center bead region, and the side top cover weld region in a bead extension direction; and the second detection region is located on second sides of the upper top cover weld region, the center bead region, and the side top cover weld region in the bead extension direction. Because the weld has the curvature, an R-angle region of the weld is identified, thereby facilitating independent determining for a defect in the R-angle region.

In some embodiments, the obtaining a plurality of detection regions further includes: expanding a seventh edge location of the weld region in the bead extension direction by a fourth predetermined distance in a direction close to the upper top cover weld region, the center bead region, and the side top cover weld region, to obtain an eighth edge location of the first detection region, where the seventh edge location is an edge location of the first detection region in a direction away from the upper top cover weld region, the center bead region, and the side top cover weld region. The edge locations of the first detection region are identified, thereby improving the accuracy of weld division.

In some embodiments, the obtaining a plurality of detection regions further includes: expanding a ninth edge location of the weld region in the bead extension direction by a fifth predetermined distance in the direction close to the upper top cover weld region, the center bead region, and the side top cover weld region, to obtain a tenth edge location of the second detection region, where the ninth edge location is an edge location of the second detection region in the direction away from the upper top cover weld region, the center bead region, and the side top cover weld region. The edge locations of the second detection region are identified, thereby improving the accuracy of weld division.

In some embodiments, the method further includes: obtaining at least one first detection box including a detection target according to the first image, where the first detection box includes a category; obtaining a to-be-identified detection box according to the at least one first detection box; determining a detection region corresponding to the to-be-identified detection box according to a location of the to-be-identified detection box in the weld; and determining at least one piece of attribute information of the detection target in the to-be-identified detection box; and the determining that the weld has a defect when preset attribute information of at least one detection region in the plurality of detection regions of the weld satisfies a preset condition includes: determining that the weld has a defect when at least one piece of attribute information of the detection target in at least one to-be-identified detection box of the at least one detection region is greater than or equal to a measurement threshold corresponding to a category and the detection region of the to-be-identified detection box in which the detection target is located. Detection boxes are positioned, and a detection region in which each detection box is located is determined, to facilitate detection on a target in each detection box according to a criterion of the detection region in which the detection box is located, to identify whether the target is a defect, and further determine whether the weld has a defect, thereby improving the detection accuracy and efficiency.

In some embodiments, the method further includes: before the determining a detection region corresponding to the to-be-identified detection box according to a location of the to-be-identified detection box in the weld, obtaining a second image of welding between the battery top cover and the case, where the second image includes brightness information; and obtaining at least one second detection box including the detection target according to the second image, where the second detection box includes a category; and the obtaining a to-be-identified detection box according to the at least one first detection box includes: obtaining the to-be-identified detection box according to the at least one first detection box and the at least one second detection box. The image having the brightness information and the image having the structural information are comprehensively analyzed, so that a probability of missed detection on a detection box can be reduced.

In some embodiments, the at least one piece of attribute information includes a measurement distance; and the determining at least one piece of attribute information of the detection target in the to-be-identified detection box includes: using a cross section of a region that does not belong to the to-be-identified detection box and that is adjacent to the to-be-identified detection box as a measurement reference plane of the to-be-identified detection box; and determining a measurement distance between the detection target and the measurement reference plane of the to-be-identified detection box in which the detection target is located. A more accurate measurement reference point is found, so that an actual measurement value of a defect can be truly and effectively reflected, thereby effectively improving accuracy of a specification measurement value.

In some embodiments, the at least one piece of attribute information includes the measurement distance, and the plurality of detection regions include the upper top cover weld region, the center bead region, and the side top cover weld region, where the center bead region is located between the upper top cover weld region and the side top cover weld region in the bead width direction; and the determining at least one piece of attribute information of the detection target in the to-be-identified detection box includes: when the to-be-identified detection box in which the detection target is located is located in the upper top cover weld region, using, according to a pixel distribution difference in the first image, a cross section of a non-weld region closest to the upper top cover weld region in the bead width direction as the measurement reference plane of the to-be-identified detection box in which the detection target is located; or when the to-be-identified detection box in which the detection target is located is located in the side top cover weld region, using, according to a pixel distribution difference in the first image, a cross section of a non-weld region closest to the side top cover weld region in the bead width direction as the measurement reference plane of the to-be-identified detection box in which the detection target is located; or when the to-be-identified detection box in which the detection target is located is located in the center bead region, using a cross section of the center bead region except the detection target as the measurement reference plane of the to-be-identified detection box in which the detection target is located; and determining the measurement distance between the detection target and the measurement reference plane of the to-be-identified detection box in which the detection target is located. More accurate measurement reference points are selected for different detection regions, so that an actual measurement value of a defect can be truly and effectively reflected, thereby effectively improving accuracy of a specification measurement value.

In some embodiments, the plurality of detection regions further include the first detection region and the second detection region, where the first detection region is located on the first sides of the upper top cover weld region, the center bead region, and the side top cover weld region in the bead extension direction; and the second detection region is located on the second sides of the upper top cover weld region, the center bead region, and the side top cover weld region in the bead extension direction; and the determining at least one piece of attribute information of the detection target in the to-be-identified detection box includes: when the to-be-identified detection box in which the detection target is located is located in the first detection region, using a cross section of the first detection region except the detection target as the measurement reference plane of the to-be-identified detection box in which the detection target is located; or when the to-be-identified detection box in which the detection target is located is located in the second detection region, using a cross section of the second detection region except the detection target as the measurement reference plane of the to-be-identified detection box in which the detection target is located; and determining the measurement distance between the detection target and the measurement reference plane of the to-be-identified detection box in which the detection target is located. A corresponding measurement reference point is selected for a target located in an R-angle region, so that a true measurement value of a defect in the region is improved, thereby improving measurement accuracy.

In some embodiments, the at least one piece of attribute information further includes area information; and the determining at least one piece of attribute information of the detection target in the to-be-identified detection box further includes: determining pixels corresponding to the detection target according to depth information of pixels in the first image; and determining the area information of the detection target according to the pixels corresponding to the detection target in the first image. Area information of each detection target is detected, thereby facilitating comparison between the area information and a threshold, and implementing defect determining by using an area.

In some embodiments, the obtaining at least one first detection box including a detection target includes: obtaining at least one first suspected detection box in the first image, where the first suspected detection box includes a category and a probability confidence; and performing filtering on the at least one first suspected detection box based on a probability confidence threshold, to obtain the at least one first detection box. Invalid detection boxes are filtered out, so that accuracy of subsequent defect detection can be improved.

In some embodiments, the obtaining at least one second detection box including the detection target includes: obtaining at least one second suspected detection box in the second image, where the second suspected detection box includes a category and a probability confidence; and performing filtering on the at least one second suspected detection box based on a probability confidence threshold, to obtain the at least one second detection box. Invalid detection boxes are filtered out, so that accuracy of subsequent defect detection can be improved.

In some embodiments, the method further includes: setting a measurement threshold for the attribute information of the detection target in the to-be-identified detection box according to the category and the detection region of the to-be-identified detection box. A corresponding measurement threshold is set for each detection box according to a category and a detection region, so that accuracy of identifying a defect in each detection box can be improved.

According to a second aspect, a welding defect detection apparatus is provided, including: an image obtaining module, configured to obtain a first image of welding between a battery top cover and a case, where the first image includes structural information; a first division module, configured to perform weld region detection in the first image, to obtain a weld region and non-weld regions; a second division module, configured to determine a plurality of detection regions of a weld between the battery top cover and the case according to the weld region and the non-weld regions; and a defect identification module, configured to determine that the weld has a defect when preset attribute information of at least one detection region in the plurality of detection regions of the weld satisfies a preset condition.

In the technical solution of the embodiments of the present application, region division is performed in an image to clearly determine a weld region of interest and non-weld regions, and then a weld structure is refined to obtain a plurality of detection regions, thereby facilitating independent defect determining for the detection regions. In addition, when preset attribute information of at least one detection region satisfies the preset condition, it is determined that the weld has a defect. Through region analysis and specification control, when the weld defect is effectively intercepted, a misjudgment rate of the weld defect can be reduced, thereby improving the battery yield and the delivery volume.

According to a third aspect, a welding defect detection apparatus is provided, including: a memory; and a processor coupled to the memory, where the processor is configured to perform the foregoing welding defect detection method based on instructions stored in the memory.

According to a fourth aspect, a computer-readable storage medium is provided, storing computer program instructions, where the instructions, when executed by a processor, implement the foregoing welding defect detection method.

According to a fifth aspect, a computer program product is provided, including computer programs or instructions, where the computer programs or the instructions, when run on a computer, cause the computer to perform the foregoing welding defect detection method.

Other features and advantages of the present disclosure will become apparent from the following detailed description of exemplary embodiments of the present application with reference to the accompanying drawings.

BRIEF DESCRIPTION OF THE DRAWINGS

To describe the technical solutions of the embodiments of the present application more clearly, the accompanying drawings required in the embodiments of the present application are briefly described. Apparently, the accompanying drawings described below are only some embodiments of the present application. For a person of ordinary skill in the art, other accompanying drawings can be further obtained based on the accompanying drawings without creative efforts.

FIG. 1 is a schematic flowchart 1 of a welding defect detection method according to one or more embodiments;

FIG. 2 is a schematic diagram of relative locations of a camera and a battery cell according to one or more embodiments;

FIG. 3 is a schematic flowchart 2 of a welding defect detection method according to one or more embodiments;

FIG. 4 is a diagram of an example of structured division of a weld according to one or more embodiments;

FIG. 5 is a schematic flowchart 3 of a welding defect detection method according to one or more embodiments;

FIG. 6 is a schematic diagram of defect attribute detection according to one or more embodiments;

FIG. 7 is a schematic flowchart 4 of a welding defect detection method according to one or more embodiments;

DETAILED DESCRIPTION

Figure 8:
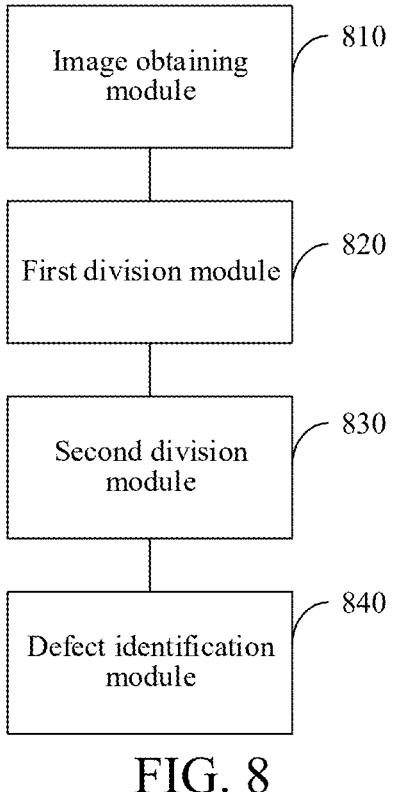
FIG. 8 is a schematic structural diagram 1 of a welding defect detection apparatus according to one or more embodiments.

The embodiments of the present application are described in further detail below with reference to the accompanying drawings and embodiments. Detailed descriptions of the following embodiments and the accompanying drawings are used to exemplarily illustrate the principle of the present application, rather than used to limit the protection scope of the present application. In other words, the present application is not limited to the described embodiments.

In the descriptions of the present application, it should be noted that, "a plurality of" means two or more than two; and the orientations or positional relationships indicated by the terms "upper", "lower", "left", "right", "inside", "outside", and the like are used only for ease and brevity of illustration and description of the present application, rather than indicating or implying that the mentioned apparatus or component needs to have a particular orientation or needs to be constructed and operated in a particular orientation. Therefore, such terms should not be construed as limiting of the present application. In addition, the terms "first", "second", "third", and the like are used for descriptive objectives only and are not to be construed as indicating or implying relative importance. The term "vertical" is not strictly vertical, but is within an error allowance range. The term "parallel" is not strictly parallel, but is within an error allowance range.

In addition, it should be understood that, for ease of description, the sizes of the parts shown in the accompanying drawings are not drawn according to an actual proportional relationship.

Actually, the following descriptions of at least one exemplary embodiment are only illustrative, and in no way constitute any limitation on the present application and application or use of the present application.

Technologies, methods, and devices known to those of ordinary skill in related arts may not be discussed in detail, but when appropriate, the technologies, the methods, and the devices should be considered as a part of this specification.

In all examples shown and discussed herein, any specific value should be construed as only exemplary and not as limitations. Therefore, other examples of exemplary embodiments may have different values.

It should be noted that, similar reference signs or letters in the accompanying drawings indicate similar items. Therefore, once an item is defined in one accompanying drawing, the item does not need to be further discussed in the subsequent accompanying drawings.

To make the objectives, technical solutions, and advantages of the present application clearer and more understandable, the present application is further described in detail below with reference to specific embodiments and the accompanying drawings.

In the related art, after a camera scans a bead, defect features are directly extracted, and an artificial intelligence (AI) model is established. During normal production, the AI model directly positions and identifies a defect. Although the model can detect a defect, due to direct positioning and lack of region and specification control and filtering, the misjudgment rate is large, affecting the delivery volume.

In the embodiments of the present application, a weld region of interest and non-weld regions of no interest are identified, and then a weld is refined and divided, so that each region can be detected. In addition, when preset attribute information of at least one detection region satisfies a preset condition, it is determined that the weld has a defect, so that the misjudgment can be reduced, and the accuracy of weld defect detection can be improved, thereby improving the battery yield and the delivery volume.

FIG. 1 is a schematic flowchart 1 of a welding defect detection method according to one or more embodiments. The embodiments are performed by a welding defect detection apparatus.

Step 110: Obtain a first image of welding between a battery top cover and a case, where the first image includes structural information.

In some embodiments, the first image is a depth image. The depth image includes structural information such as a contour feature and a depth feature. The contour feature is analyzed, so that different regions in the image can be identified.

In some embodiments, as shown in FIG. 2, an industrial camera 210 is deployed (two industrial cameras 210 are shown in FIG. 2). The industrial camera is, for example, a three-dimensional (3D) camera. The 3D camera emits laser at a specific angle, and scans a weld of a top cover of a battery cell 220 by using the laser, to obtain imaging of the weld of the top cover. The 3D camera is, for example, a line scanning camera. An angle of 20° to 40°, for example, 30°, is formed between laser emitted by the camera and an axis of the battery cell. A distance between the camera and the weld ranges from 45 mm to 75 mm, for example, is 60 mm. A person skilled in the art should understand that herein, limitations on the angle and the distance are only for examples, and a corresponding angle and distance may be set according to a specific situation of a production line. The 3D camera may simultaneously generate a gray scale image including brightness information and a depth image including structural information, where the gray scale image has a gray scale feature. By using the obtained image, digital modeling can be performed.

Step 120: Perform weld region detection in the first image, to obtain a weld region and non-weld regions.

The laser emitted by the 3D camera has a particular width, and when the weld of the top cover is scanned for imaging, a large number of redundant regions usually exist in the image. If structured division of the imaging is not performed, detection misjudgment on many regions of no interest is caused, and detection efficiency is affected. In some embodiments, the contour feature in the depth image is analyzed, so that the weld region of interest and the non-weld regions of no interest can be identified.

Step 130: Determine a plurality of detection regions of a weld between the battery top cover and the case according to the weld region and the non-weld regions.

In some embodiments, the weld structure is refined and divided into an upper top cover weld region, a side top cover weld region, and a center bead region, which is conducive to formulating independent defect measurement criteria for different weld regions on the production line.

For example, a difference between thicknesses of aluminum case materials of an upper top cover and a side top cover leads to different measurement criteria of defect specifications. For example, the thickness of the aluminum case of the upper top cover is generally greater than the thickness of the aluminum case of the side top cover, and a risk that a pinhole defect with a same depth occurs in the side top cover weld region is usually higher than a risk that the pinhole defect with the same depth occurs in the upper top cover weld region. Therefore, in this step, the weld is divided to obtain the plurality of detection regions.

Step 140: Determine that the weld has a defect when preset attribute information of at least one detection region in the plurality of detection regions of the weld satisfies a preset condition.

In some embodiments, for each detection region, a measurement threshold for each detection attribute of a detection target in the detection region may be adaptively formulated according to an actual production process, a defect specification criterion, and the like. For example, depth information, height information, or area information of the detection target in each region is detected, and obtained data is compared with an attribute threshold of the detection target in the detection region, to determine whether the detection target in the detection region is a defect, and determine that the weld has a defect when a detection target in at least one detection region is a defect. The detection target is, for example, a protrusion, a pit, a pinhole, an explosion point, polarization, or a discontinuity.

In the foregoing embodiments, the weld region of interest and the non-weld regions of no interest are identified by using the first image including the structural information, to further obtain the plurality of detection regions of the weld, so that the detection target in each detection region can be distinguished according to a process difference and different region defect criteria. In addition, when the preset attribute information of the at least one detection region satisfies the preset condition, it is determined that the weld has a defect, so that when the weld defect is effectively intercepted, the misjudgment rate is reduced, and the accuracy of weld defect detection is improved, thereby improving the battery yield and the delivery volume.

FIG. 3 is a schematic flowchart 2 of a welding defect detection method according to one or more embodiments. As shown in FIG. 3, step 130 may be implemented by using step 310 to step 330.

Step 310: Determine an effective width and a center width of the weld region in a bead width direction.

In some embodiments, a first edge location and a second edge location of the weld region in the bead width direction are determined; and the effective width of the weld region in the bead width direction is obtained according to a difference between the second edge location and the first edge location.

As shown in FIG. 4, a line 420 to a line 450 indicate a weld region, a line 450 indicates a first edge location of the weld region, and a line 420 indicates a second edge location of the weld region. If the line 420 is a left starting location of a weld and a coordinate of the left starting location in a bead width direction in the figure is L, and the line 450 is a right ending location of the weld and a coordinate of the right ending location in the bead width direction in the figure is R, an effective width of the weld region is that W=R−L.

In some embodiments, the center width is determined according to the effective width of the weld region. For example, the effective width is multiplied by a particular proportion coefficient, to obtain the center width. A value of the proportion coefficient $\rho$ is that $0<\rho<1$. A specific value is related to a protrusion degree of the weld. In some embodiments, the center width may alternatively be directly preset.

Step 320: Determine, according to the effective width, a first predetermined distance and a second predetermined distance by which the weld region is expanded toward the non-weld regions in the bead width direction.

In some embodiments, although the weld region has been identified by using the image, in an actual application, a weld defect extends. Therefore, the weld region is separately expanded toward non-weld regions on left and right sides in FIG. 4. For example, the line 420 is expanded leftward by a second predetermined distance, to obtain a line 410; and the line 450 is extended rightward by a first predetermined distance, to obtain a line 460. A region between the line 410 and the line 460 is a region that needs to be analyzed. The first predetermined distance and the second predetermined distance may be the same or may be different, and are valued as, for example, 2 mm.

Step 330: Perform region division of the weld based on the first predetermined distance, the second predetermined distance, and the center width, to obtain the plurality of detection regions.

In some embodiments, according to the difference between the thicknesses of the aluminum case materials of the upper top cover and the side top cover, the weld is divided into the upper top cover weld region, the center bead region, and the side top cover weld region, where the center bead region is located between the upper top cover weld region and the side top cover weld region in the bead width direction.

Compared with a manner in which the weld is considered as a whole and is not divided, in the foregoing embodiments, the weld is divided into the plurality of detection regions, to facilitate subsequent setting of a threshold for the detection target in each detection region and determining for each detection target, thereby more accurately and flexibly determining a weld defect.

In some embodiments, a third edge location and a fourth edge location of the center bead region in the bead width direction are determined according to the first edge location, the second edge location, the effective width, and the center width of the weld region in the bead width direction.

For example, the first edge location is moved by a third predetermined distance toward the second edge location, to obtain the third edge location, where the third predetermined distance is half a difference between the effective width and the center width; and the second edge location is moved by the third predetermined distance toward the first edge location, to obtain the fourth edge location.

By using FIG. 4 as an example, the line 450 indicates the first edge location of the weld region, the line 420 indicates the second edge location of the weld region, the line 450 is moved leftward by a third predetermined distance, to obtain a line 440, namely, a third edge location, and the line 420 is moved rightward by the third predetermined distance, to obtain a line 430, namely, a fourth edge location. In this way, a left starting location and a right ending location of a center bead region are determined.

In some embodiments, a coordinate of the left starting location of the center bead region in the bead width direction is $L+(1-p)*W/2$, and a coordinate of the right ending location of the center bead region in the bead width direction is R−(1−p)*W/2. (1−p)*W/2 is the third predetermined distance. In some embodiments, the third predetermined distance may alternatively be a preset value.

In some embodiments, in the bead width direction, the first edge location is expanded by the first predetermined distance toward a non-weld region in a direction away from the center bead region, to obtain a fifth edge location of the upper top cover weld region in the bead width direction, where the third edge location is an edge location of the upper top cover weld region close to the center bead region in the bead width direction.

By using FIG. 4 as an example, a weld expansion width of an upper top cover is set, to determine a boundary point between an upper top cover weld region and a non-weld detection region. The line 450 is expanded rightward by the first predetermined distance, to obtain the line 460, namely, a fifth edge location. The line 460 is determined as a boundary line between the upper top cover weld region and the non-weld detection region, and the line 440 is a boundary line between the upper top cover weld region and the center bead region.

In some embodiments, the first predetermined distance is determined according to the effective width of the weld. For example, the effective width is multiplied by a particular proportion coefficient, to obtain the first predetermined distance. A value of the proportion coefficient $\alpha$ is that $0<\alpha<1$. A specific value is related to an expansion degree of the weld. A coordinate of the line 460 in the bead width direction is $R+\alpha*W$. In some embodiments, the first predetermined distance may alternatively be directly preset.

In some embodiments, in the bead width direction, the second edge location is expanded by the second predetermined distance toward a non-weld region in the direction away from the center bead region, to obtain a sixth edge location of the side top cover weld region in the bead width direction, where the fourth edge location is an edge location of the side top cover weld region close to the center bead region in the bead width direction.

By using FIG. 4 as an example, a weld expansion width of a side top cover is set, to determine a boundary point between a side top cover weld region and a non-weld detection region. The line 420 is expanded leftward by the second predetermined distance, to obtain the line 410, namely, a sixth edge location. The line 410 is determined as a boundary line between the side top cover weld region and the non-weld detection region, and the line 430 is a boundary line between the side top cover weld region and the center bead region.

In some embodiments, the second predetermined distance is determined according to the effective width of the weld. For example, the effective width is multiplied by a particular proportion coefficient, to obtain the second predetermined distance. A value of the proportion coefficient $\alpha$ is that $0<\alpha<1$. A specific value is related to the expansion degree of the weld. A coordinate of the line 410 in the bead width direction is $L−\alpha*W$. In some embodiments, the second predetermined distance may alternatively be directly preset.

In the foregoing embodiments, due to a difference between weld processes of the upper top cover and the side top cover of the battery cell, the weld region is divided into the upper top cover weld region, the center bead region, and the side top cover weld region, so that structured division of the weld is implemented, thereby facilitating formulation of independent defect measurement criteria for different weld regions on the production line.

In some embodiments, the plurality of detection regions further include a first detection region and a second detection region, where the first detection region is located on first sides of the upper top cover weld region, the center bead region, and the side top cover weld region in a bead extension direction; and the second detection region is located on second sides of the upper top cover weld region, the center bead region, and the side top cover weld region in the bead extension direction. The first detection region and the second detection region are R-angle regions, that is, connection locations of two adjacent edges of a top cover. A size of the R-angle region is related to the angle between the laser and the battery cell. A smaller horizontal angle between the laser and the battery cell indicates a longer R-angle imaging region.

In some embodiments, a seventh edge location of the weld region in the bead extension direction is expanded by a fourth predetermined distance in a direction close to the upper top cover weld region, the center bead region, and the side top cover weld region, to obtain an eighth edge location of the first detection region, where the seventh edge location is an edge location of the first detection region in a direction away from the upper top cover weld region, the center bead region, and the side top cover weld region.

By using FIG. 4 as an example, a line 490 is moved downward by a fourth predetermined distance, to obtain a line 470, namely, an eighth edge location. The line 490 corresponds to a seventh edge location. The fourth predetermined distance is, for example, 10 mm. A value of the fourth predetermined distance is related to a horizontal angle between the laser and the battery cell.

In some embodiments, a ninth edge location of the weld region in the bead extension direction is expanded by a fifth predetermined distance in the direction close to the upper top cover weld region, the center bead region, and the side top cover weld region, to obtain a tenth edge location of the second detection region, where the ninth edge location is an edge location of the second detection region in the direction away from the upper top cover weld region, the center bead region, and the side top cover weld region.

By using FIG. 4 as an example, a line 4100 is moved upward by a fifth predetermined distance, to obtain a line 480, namely, a tenth edge location. The line 4100 corresponds to a ninth edge location. The fifth predetermined distance is, for example, 10 mm. A value of the fifth predetermined distance is related to the horizontal angle between the laser and the battery cell.

In the foregoing embodiments, the weld is divided into the upper top cover weld region, the center bead region, and the side top cover weld region, and is also divided into the R-angle regions, thereby implementing more refined division, and further improving accuracy of subsequent detection.

FIG. 5 is a schematic flowchart 3 of a welding defect detection method according to one or more embodiments.

Step 510: Obtain at least one first detection box including a detection target according to the first image.

The first detection box includes a category.

In some embodiments, the first image is input into a fully trained deep learning algorithm model for defect detection. The deep learning algorithm model is, for example, an MMDetection model based on target detection. Compared with another detection module, the model covers state-of-the-art methods in more target detection fields, and can achieve very high detection precision. The model can output a series of detection boxes including category information and probability confidences. The category information includes, for example, a protrusion category, a pit category, a pinhole category, an explosion point category, a polarization category, and a discontinuity category. A model training process is not limited in the present application.

In some embodiments, at least one first suspected detection box in the first image is obtained, where the first suspected detection box includes a category and a probability confidence; and filtering is performed on the at least one first suspected detection box based on a probability confidence threshold, to obtain the at least one first detection box.

For example, threshold control related to a probability confidence is performed on each suspected detection box, so that some misjudged detection boxes can be filtered out, thereby improving subsequent detection efficiency and accuracy.

Step 520: Obtain a to-be-identified detection box according to the at least one first detection box.

For example, if the model outputs five detection boxes, five to-be-identified detection boxes are obtained.

Step 530: Determine a detection region corresponding to the to-be-identified detection box according to a location of the to-be-identified detection box in the weld.

For example, whether the detection box is located in the upper top cover weld region, the center bead region, the side top cover weld region, or an R-angle region is identified.

Step 540: Determine at least one piece of attribute information of the detection target in the to-be-identified detection box.

In some embodiments, the attribute information includes, for example, at least one of the following: a depth attribute, a height attribute, and an area attribute.

Step 550: Determine that the weld has a defect when at least one piece of attribute information of the detection target in at least one to-be-identified detection box of the at least one detection region is greater than or equal to a measurement threshold corresponding to a category and the detection region of the to-be-identified detection box in which the detection target is located.

In some embodiments, a measurement threshold for each attribute information of the detection target in the to-be-identified detection box is set according to the category and the detection region of the to-be-identified detection box. In other words, a measurement threshold is related to a defect category and a defect detection region. For example, a measurement threshold obtained for a pinhole located in the upper top cover weld region is different from a measurement threshold obtained for a pinhole located in the side top cover weld region. For another example, different measurement thresholds may be respectively set for a pinhole and a protrusion. For another example, different measurement thresholds are set for a pinhole located in the upper top cover weld region, a pinhole located in the side top cover weld region, a protrusion located in the upper top cover weld region, and a protrusion located in the side top cover weld region. In this way, accuracy of identifying a defect in each detection box can be improved.

In the foregoing embodiments, each detection box, a category of each detection box, attribute information of a detection target in each detection box, and a detection region in which each detection box is located are identified, to determine that the weld has a defect when it is identified that attribute information of at least one detection target is greater than a measurement threshold corresponding to a category and a detection region of a detection box in which the detection target is located. Visual texture information and defect structural information are combined, so that a detection result is more accurate, and the battery yield can be improved.

In some other embodiments of the present application, a second image of welding between the battery top cover and the case is obtained, where the second image includes brightness information; at least one second detection box including the detection target is obtained according to the second image, where the second detection box includes a category; and the to-be-identified detection box is obtained according to the at least one first detection box and the at least one second detection box.

For example, four first detection boxes are obtained by using a depth image, and five second detection boxes are obtained by using a gray scale image. Pixel coordinates of the depth image and the gray scale image are calibrated to obtain a mapping relationship between the pixel coordinates of the depth image and the gray scale image. Locations of the five second detection boxes in the depth image may be obtained by using the mapping relationship. During obtaining of a to-be-identified detection box, both a detection box obtained by using the depth image and a detection box obtained by using the gray scale image are considered, to make up for missed detection on a detection box caused by only considering the depth image.

In some embodiments, at least one second suspected detection box in the second image is obtained, where the second suspected detection box includes a category and a probability confidence; and filtering is performed on the at least one second suspected detection box based on a probability confidence threshold, to obtain the at least one second detection box.

For example, threshold control related to a probability confidence is performed on each suspected detection box, so that some misjudged detection boxes can be filtered out, thereby improving subsequent detection efficiency and accuracy.

In the related art, when a height or a depth of a defect is measured, an aluminum case plane is used as a reference plane. Because a weld has a particular thickness after a top cover is welded, a value calculated by using this method cannot reflect measurement values such as a true depth and height of the defect. In addition, when a plurality of defects are close to each other, for example, when a pinhole and a protrusion exist, a measurement reference point is usually not accurate enough, resulting in a measurement error. In the embodiments of the present application, the measurement method in which the aluminum case plane is used as the reference plane is discarded, and instead, a cross section of a weld obtained after welding is selected as a reference. A specific implementation process is as follows.

In some embodiments of the present application, a cross section of a region that does not belong to the to-be-identified detection box and that is adjacent to the to-be-identified detection box is used as a measurement reference plane of the to-be-identified detection box; and a measurement distance between the detection target and the measurement reference plane of the to-be-identified detection box in which the detection target is located is determined. For a protrusion, the measurement distance is a height value. For a pinhole, the measurement distance is a depth value.

By using FIG. 6 as an example, if a depth of a concave pinhole needs to be measured and the pinhole is close to a protrusion, a lower probability confidence threshold is controlled by using a fully trained model, to reduce a possibility of missed detection. For example, the probability confidence threshold is 0.05, and all defect locations on a weld in an image can be obtained. For example, a curve 610 is a defect-containing region, and a straight line 620 is a defect-free region. By using the straight line 620 as a measurement reference plane, an accompanying slight protrusion point can be effectively avoided, and a distance between a recessed point of a pinhole and a reference point can be calculated, so that a more accurate depth measurement value of the pinhole is obtained. For example, a distance obtained by using a correct measurement plane is shown by a reference sign 630. By using the related art, it is easy to select an incorrect reference point to cause a measurement error, and an obtained measurement distance is shown by a reference sign 640.

In the embodiments, all the defect locations of the weld in the image are output in a form of detection boxes, locations of the detection boxes form a defect-containing region, and an area outside the detection boxes forms a defect-free region. A point in the defect-free region is selected as a measurement reference point, so that a problem of inaccurate measurement caused by a plurality of defects being close to each other can be effectively reduced.

In some embodiments, when the to-be-identified detection box in which the detection target is located is located in the upper top cover weld region, according to a pixel distribution difference in the first image, a cross section of a non-weld region closest to the upper top cover weld region in the bead width direction is used as the measurement reference plane of the to-be-identified detection box in which the detection target is located; and the measurement distance between the detection target and the measurement reference plane of the to-be-identified detection box in which the detection target is located is determined.

By using FIG. 4 as an example, if a detection box is located between the line 440 to the line 460, a cross section of a non-weld detection region on a right side of the line 460 is used as a measurement reference plane. Because no defect exists in the plane of the non-weld detection region, a result obtained through measurement is more accurate.

In some embodiments, when the to-be-identified detection box in which the detection target is located is located in the side top cover weld region, according to a pixel distribution difference in the first image, a cross section of a non-weld region closest to the side top cover weld region in the bead width direction is used as the measurement reference plane of the to-be-identified detection box in which the detection target is located; and the measurement distance between the detection target and the measurement reference plane of the to-be-identified detection box in which the detection target is located is determined.

By using FIG. 4 as an example, if a detection box is located between the line 410 to the line 430, a cross section of a non-weld detection region on a left side of the line 410 is used as a measurement reference plane. Because no defect exists in the plane of the non-weld detection region, a result obtained through measurement is more accurate.

In some embodiments, when the to-be-identified detection box in which the detection target is located is located in the center bead region, a cross section of the center bead region except the detection target is used as the measurement reference plane of the to-be-identified detection box in which the detection target is located; and the measurement distance between the detection target and the measurement reference plane of the to-be-identified detection box in which the detection target is located is determined.

By using FIG. 4 as an example, if a detection box is located between the line 430 to the line 440, because defects may exist in the entire center bead region, a cross section of the region except the detection box is used as a measurement reference plane. No defect exists in the measurement reference plane. Therefore, measurement accuracy can also be improved.

In some embodiments, when the to-be-identified detection box in which the detection target is located is located in the first detection region, a cross section of the first detection region except the detection target is used as the measurement reference plane of the to-be-identified detection box in which the detection target is located; or when the to-be-identified detection box in which the detection target is located is located in the second detection region, a cross section of the second detection region except the detection target is used as the measurement reference plane of the to-be-identified detection box in which the detection target is located; and the measurement distance between the detection target and the measurement reference plane of the to-be-identified detection box in which the detection target is located is determined.

For a defect located in an R-angle region, a cross section of the region except a detection box is used as a measurement reference plane. No defect exists in the measurement reference plane. Therefore, measurement accuracy can also be improved.

In the foregoing embodiments, a more accurate measurement reference point is found, so that an actual measurement value of a defect can be truly and effectively reflected. Even if a plurality of defects are close to each other, accuracy of a specification measurement value can also be effectively improved.

In some embodiments, pixels corresponding to the detection target are determined according to depth information of pixels in the first image; and the area information of the detection target is determined according to the pixels corresponding to the detection target in the first image.

For example, each pixel has three-axis coordinates, that is, an x-axis coordinate, a y-axis coordinate, and a z-axis coordinate. The z-axis coordinate indicates an image depth, the x-axis coordinate indicates information in the bead width direction, and the y-axis coordinate indicates information in the bead extension direction. When the z-axis coordinate changes, it indicates that the pixel is a pixel of a detection target. Continuous pixels whose z-axis coordinates change are detected, so that an area corresponding to the pixels can be obtained. The area is an area of the detection target. Subsequently, whether the detection target is a defect can be determined by determining whether the area of the detection target exceeds a threshold.

FIG. 7 is a schematic flowchart 4 of a welding defect detection method according to one or more embodiments.

Step 710: A 3D camera scans a weld of a top cover, to obtain a gray scale image including brightness information and a depth image including structural information.

Step 720: Input the gray scale image and the depth image into a trained deep learning model, to obtain some suspected detection boxes including category information and probability confidences.

Step 730: Filter out misjudged detection boxes.

For example, threshold control related to a probability confidence is performed on each suspected detection box, so that some misjudged detection boxes can be filtered out, thereby improving subsequent detection precision and efficiency.

Step 740: Perform structured division of the weld, and determine a specific detection region of each detection box in the weld.

Step 750: Perform attribute measurement on a detection target in each detection box.

Step 760: Determine an attribute of each detection target according to measurement thresholds corresponding to different detection regions and different categories of defects, to determine whether the detection target is a defect.

Step 770: Determine that a battery is a bad product when it is recognized that a defect exists.

In the foregoing embodiments, a bead region segmentation algorithm is introduced to perform segmentation of detection regions according to an actual requirement, and independent specification control of each region is performed based on a specification measurement. In other words, visual texture information and defect structural information are combined, so that a misjudgment rate of a good battery product can be reduced, thereby improving the battery yield and the delivery volume. The embodiments can improve accuracy of weld defect detection, and can also better conform to defect detection logic in an actual scenario, thereby having very strong universality.

FIG. 8 is a schematic structural diagram 1 of a welding defect detection apparatus according to one or more embodiments. The welding defect detection apparatus includes an image obtaining module 810, a first division module 820, a second division module 830, and a defect identification module 840.

The image obtaining module 810 is configured to obtain a first image of welding between a battery top cover and a case, where the first image includes structural information.

In some embodiments, the image obtaining module 810 is further configured to obtain a second image of welding between the battery top cover and the case, where the second image includes brightness information.

The first division module 820 is configured to perform weld region detection in the first image, to obtain a weld region and non-weld regions.

In some embodiments, a contour feature in a depth image is analyzed, so that the weld region of interest and the non-weld regions of no interest can be identified.

The second division module 830 is configured to determine a plurality of detection regions of a weld between the battery top cover and the case according to the weld region and the non-weld regions.

In some embodiments, the second division module 830 is configured to determine an effective width and a center width of the weld region in a bead width direction; determine, according to the effective width, a first predetermined distance and a second predetermined distance by which the weld region is expanded toward the non-weld regions in the bead width direction; and perform region division of a weld based on the first predetermined distance, the second predetermined distance, and the center width, to obtain a plurality of detection regions. The effective width is determined according to a difference between a first edge location and a second edge location of the weld region in the bead width direction.

For example, the weld structure is refined and divided into an upper top cover weld region, a side top cover weld region, and a center bead region, which is conducive to formulating independent defect measurement criteria for different weld regions on a production line.

The defect identification module 840 is configured to determine that the weld has a defect when preset attribute information of at least one detection region in the plurality of detection regions of the weld satisfies a preset condition.

In the foregoing embodiments, the weld region of interest and the non-weld regions of no interest are identified by using the first image including the structural information, to further obtain the plurality of detection regions of the weld, so that the detection target in each detection region can be distinguished according to a process difference and different region defect criteria. In addition, when the preset attribute information of the at least one detection region satisfies the preset condition, it is determined that the weld has a defect, so that when the weld defect is effectively intercepted, the misjudgment is reduced, and the detection accuracy is improved, thereby improving the battery yield and the delivery volume.

In some embodiments of the present application, the second division module 830 is configured to determine a third edge location and a fourth edge location of the center bead region in the bead width direction according to the first edge location, the second edge location, the effective width, and the center width of the weld region in the bead width direction; expand, in the bead width direction, the first edge location by the first predetermined distance toward a non-weld region in a direction away from the center bead region, to obtain a fifth edge location of the upper top cover weld region in the bead width direction, where the third edge location is an edge location of the upper top cover weld region close to the center bead region in the bead width direction; and expand, in the bead width direction, the second edge location by the second predetermined distance toward a non-weld region in the direction away from the center bead region, to obtain a sixth edge location of the side top cover weld region in the bead width direction, where the fourth edge location is an edge location of the side top cover weld region close to the center bead region in the bead width direction.

The third edge location is obtained by moving the first edge location by a third predetermined distance toward the second edge location, where the third predetermined distance is half a difference between the effective width and the center width. The fourth edge location is obtained by moving the second edge location by a third predetermined distance toward the first edge location.

In the foregoing embodiments, the weld is divided into the upper top cover weld region, the center bead region, and the side top cover weld region, to facilitate subsequent targeted identification on detection targets in different regions, thereby improving accuracy of weld defect detection.

In some embodiments, the plurality of detection regions further include a first detection region and a second detection region, where the first detection region is located on first sides of the upper top cover weld region, the center bead region, and the side top cover weld region in a bead extension direction; and the second detection region is located on second sides of the upper top cover weld region, the center bead region, and the side top cover weld region in the bead extension direction. An R-angle region is identified, to facilitate targeted detection on a detection target located in the R-angle region, thereby improving the accuracy of weld defect detection.

The second division module 830 is configured to expand a seventh edge location of the weld region in the bead extension direction by a fourth predetermined distance in a direction close to the upper top cover weld region, the center bead region, and the side top cover weld region, to obtain an eighth edge location of the first detection region, where the seventh edge location is an edge location of the first detection region in a direction away from the upper top cover weld region, the center bead region, and the side top cover weld region.

The second division module 830 is configured to expand a ninth edge location of the weld region in the bead extension direction by a fifth predetermined distance in the direction close to the upper top cover weld region, the center bead region, and the side top cover weld region, to obtain a tenth edge location of the second detection region, where the ninth edge location is an edge location of the second detection region in the direction away from the upper top cover weld region, the center bead region, and the side top cover weld region.

In the foregoing embodiments, an R-angle region is accurately divided, so that accuracy of weld region division is improved, thereby facilitating improving accuracy of subsequent defect identification.

Figure 9:
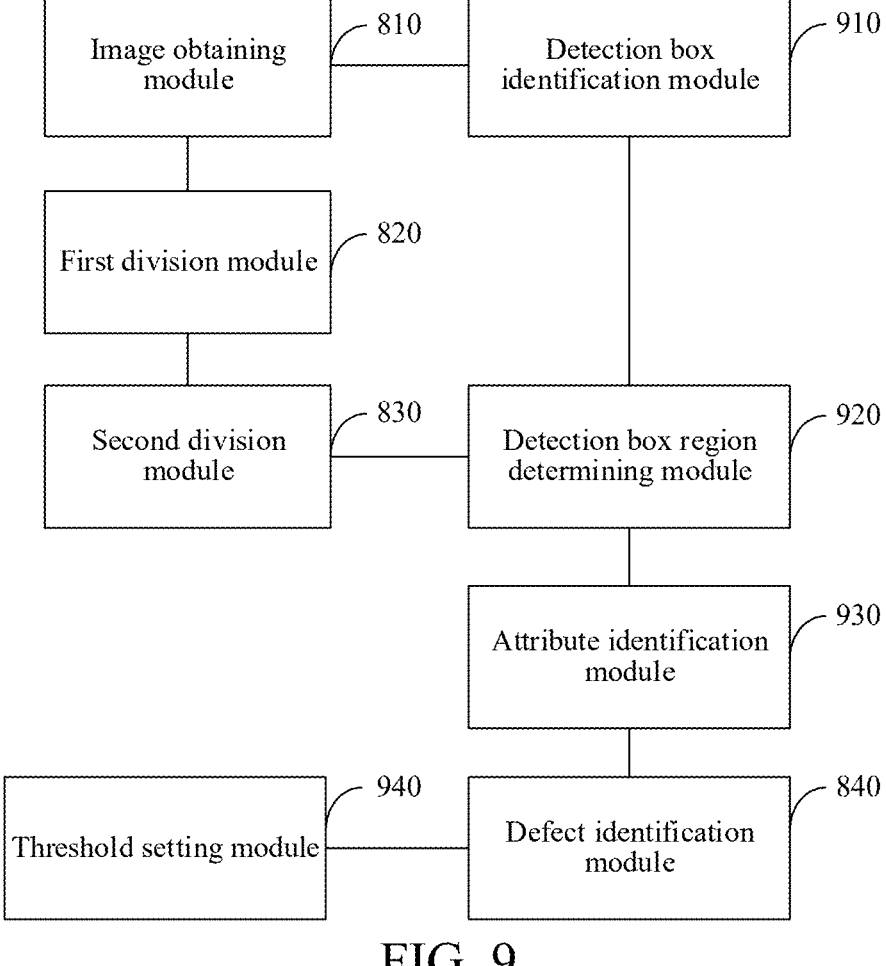
FIG. 9 is a schematic structural diagram 2 of a welding defect detection apparatus according to one or more embodiments.

FIG. 9 is a schematic structural diagram 2 of a welding defect detection apparatus according to one or more embodiments. The welding defect detection apparatus further includes a detection box identification module 910, a detection box region determining module 920, and an attribute identification module 930. The detection box identification module 910 is configured to obtain at least one first detection box including a detection target according to the first image, where the first detection box includes a category; and obtain a to-be-identified detection box according to the at least one first detection box. The detection box region determining module 920 is configured to determine a detection region corresponding to the to-be-identified detection box according to a location of the to-be-identified detection box in the weld. The attribute identification module 930 is configured to determine at least one piece of attribute information of the detection target in the to-be-identified detection box. The defect identification module 840 is configured to determine that the weld has a defect when at least one piece of attribute information of the detection target in at least one to-be-identified detection box of the at least one detection region is greater than or equal to a measurement threshold corresponding to a category and the detection region of the to-be-identified detection box in which the detection target is located.

In the embodiments, through target detection, a detection box including a detection target is identified, a detection region in which the detection box is located is defined, and attribute information of each detection target is identified, to determine attribute information of detection targets that are located in different detection regions and that have different categories, to identify whether the weld has a defect. Through region analysis and specification measurement, occurrence of misjudgment of a weld defect is reduced.

In some embodiments, the detection box identification module 910 is further configured to obtain at least one second detection box including the detection target according to the second image, where the second detection box includes a category; and obtain the to-be-identified detection box according to the at least one first detection box and the at least one second detection box. A gray scale image and a depth image are combined, so that a probability of missed detection on a detection box can be reduced.

In some embodiments, the detection box identification module 910 is further configured to obtain at least one first suspected detection box in the first image, where the first suspected detection box includes a category and a probability confidence; and perform filtering on the at least one first suspected detection box based on a probability confidence threshold, to obtain the at least one first detection box. In the embodiments, misjudged detection boxes are filtered out, thereby improving subsequent detection efficiency.

In some embodiments, the detection box identification module 910 is further configured to obtain at least one second suspected detection box in the second image, where the second suspected detection box includes a category and a probability confidence; and perform filtering on the at least one second suspected detection box based on a probability confidence threshold, to obtain the at least one second detection box. In the embodiments, misjudged detection boxes are filtered out, thereby improving subsequent detection efficiency.

In some embodiments, the attribute identification module 930 is further configured to use a cross section of a region that does not belong to the to-be-identified detection box and that is adjacent to the to-be-identified detection box as a measurement reference plane of the to-be-identified detection box; and determine a measurement distance between the detection target and the measurement reference plane of the to-be-identified detection box in which the detection target is located. A more accurate measurement reference plane is selected, so that accuracy of a true measurement value of a defect can be improved.

In some embodiments, the attribute identification module 930 is further configured to: when the to-be-identified detection box in which the detection target is located is located in the upper top cover weld region, use, according to a pixel distribution difference in the first image, a cross section of a non-weld region closest to the upper top cover weld region in the bead width direction as the measurement reference plane of the to-be-identified detection box in which the detection target is located; or when the to-be-identified detection box in which the detection target is located is located in the side top cover weld region, use, according to a pixel distribution difference in the first image, a cross section of a non-weld region closest to the side top cover weld region in the bead width direction as the measurement reference plane of the to-be-identified detection box in which the detection target is located; or when the to-be-identified detection box in which the detection target is located is located in the center bead region, use a cross section of the center bead region except the detection target as the measurement reference plane of the to-be-identified detection box in which the detection target is located; and determine the measurement distance between the detection target and the measurement reference plane of the to-be-identified detection box in which the detection target is located.

In the embodiments, different measurement reference planes are selected for detection boxes of different detection regions. Because no defect exists in a measurement reference plane, accuracy of an actual measurement value of a defect is improved. Even if a plurality of defects are close to each other, accuracy of a specification measurement value can also be effectively improved.

In some embodiments, the attribute identification module 930 is further configured to: when the to-be-identified detection box in which the detection target is located is located in the first detection region, use a cross section of the first detection region except the detection target as the measurement reference plane of the to-be-identified detection box in which the detection target is located; or when the to-be-identified detection box in which the detection target is located is located in the second detection region, use a cross section of the second detection region except the detection target as the measurement reference plane of the to-be-identified detection box in which the detection target is located; and determine the measurement distance between the detection target and the measurement reference plane of the to-be-identified detection box in which the detection target is located.

In the embodiments, a measurement reference plane of a detection box in an R-angle region is defined, so that accuracy of detecting a true measurement value of a defect in the R-angle region can be improved.

In some embodiments, the attribute identification module 930 is further configured to determine pixels corresponding to the detection target according to depth information of pixels in the first image; and determine area information of the detection target according to the pixels corresponding to the detection target in the first image.

In the embodiments, the area information of the detection target is identified, so that whether the detection target is a defect can be determined from the perspective of the area, thereby improving comprehensiveness of attribute detection.

In some embodiments, the welding defect detection apparatus further includes a threshold setting module 940, configured to set a measurement threshold for each attribute information of the detection target in the to-be-identified detection box according to the category and the detection region of the to-be-identified detection box. A corresponding measurement threshold is set for each attribute information of detection targets that are located in different detection regions and have different categories, thereby facilitating improving accuracy of subsequent defect detection.

Figure 10:
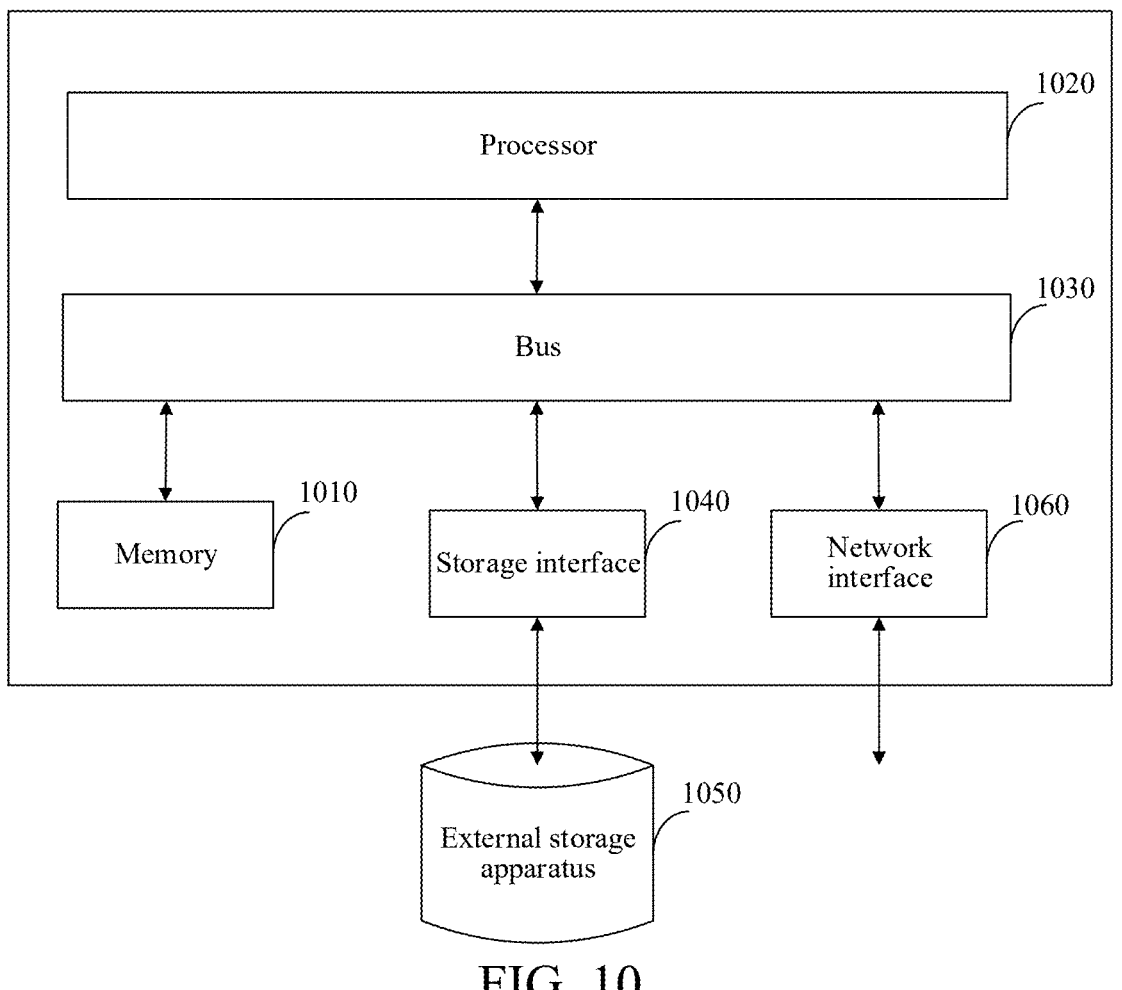
FIG. 10 is a schematic structural diagram 3 of a welding defect detection apparatus according to one or more embodiments.

FIG. 10 is a schematic structural diagram 3 of a welding defect detection apparatus according to one or more embodiments. The welding defect detection apparatus includes a memory 1010 and a processor 1020. The memory 1010 may be a magnetic disk, a flash memory, or any other non-volatile storage medium. The memory is configured to store instructions in the foregoing embodiments. The processor 1020 is coupled to the memory 1010, and may be implemented as one or more integrated circuits, for example, a microprocessor or a microcontroller. The processor 1020 is configured to execute the instructions stored in the memory.

In some embodiments, the processor 1020 is coupled to the memory 1010 by using a BUS 1030. The welding defect detection apparatus may be further connected to an external storage apparatus 1050 through a storage interface 1040, to invoke external data, and may be further connected to a network or another computer system (not shown) through a network interface 1060. Details are not described herein again.

In the embodiments, according to the welding defect detection apparatus, the memory stores the data instructions, and then the processor processes the instructions, so that a misjudgment rate of a weld defect can be reduced, and accuracy of weld defect detection can be improved.

In some other embodiments, the present application provides a computer-readable storage medium, storing computer program instructions, where the computer program instructions, when executed by a processor, implement steps of the method in the foregoing embodiments. A person skilled in the art should understand that embodiments of the present application may be provided as a method, an apparatus, or a computer program product. Therefore, the present application may use a form of hardware only embodiments, software only embodiments, or embodiments with a combination of software and hardware. In addition, the present application may take the form of a computer program product implemented on one or more computer-usable non-transitory storage media (including, but not limited to: a magnetic memory, a CD-ROM, and an optical memory) including computer-usable program code.

In some embodiments of the present application, a computer program product is further provided, including computer program instructions, where the computer program instructions, when executed by a processor, implement the welding defect detection method in any one of the foregoing embodiments.

The technical solutions of the present application can be applied to weld defect detection in an incoming material link, a battery check and sampling link, and a delivery link.

A person skilled in the art may understand that, in the foregoing method in specific embodiments, a writing order of the steps does not imply a strict order of execution and does not impose any limitation on an implementation process, and a specific execution order of the steps should be determined according to functions and possible internal logic of the steps.

The foregoing descriptions of the embodiments are intended to emphasize differences between the embodiments. Mutual reference may be made to the same or similar parts. For brevity, details are not described herein again.

So far, the present application has been described in detail. To avoid obscuring the idea of the present application, some details well-known in the art are not described. A person skilled in the art may understand how to implement the technical solutions disclosed herein according to the foregoing descriptions.

The method and the system of the present application may be implemented in many manners. For example, the method and the system of the present application may be implemented by using software, hardware, firmware, or any combination of software, hardware, and firmware. The foregoing order of the steps of the method is only used for description, and the steps of the method of the present application are not limited to the order specifically described above, unless otherwise specifically described. In addition, in some embodiments, the present application may also be implemented as programs recorded in a record medium. The programs include a machine-readable instruction for implementing the method according to the present application. Therefore, the present application further covers a record medium storing a program configured to execute the method according to the present application.

Although some specific embodiments of the present application have been described in detail by way of examples, a person skilled in the art should understand that the foregoing examples are only for description and are not intended to limit the scope of the present application. A person skilled in the art should appreciate that modifications may be made to the foregoing embodiments without departing from the scope and spirit of the present application. The scope of the present application is limited by only the appended claims.

INDUSTRIAL APPLICABILITY

Embodiments of the present disclosure provide a welding defect detection method and apparatus, a storage medium, and a program product. The welding defect detection method includes: obtaining a first image of welding between a battery top cover and a case, where the first image includes structural information; performing weld region detection in the first image, to obtain a weld region and non-weld regions; determining a plurality of detection regions of a weld between the battery top cover and the case according to the weld region and the non-weld regions; and determining that the weld has a defect when preset attribute information of at least one detection region in the plurality of detection regions of the weld satisfies a preset condition. In the technical solutions of the embodiments of the present application, region division is performed in an image to clearly determine a weld region of interest and non-weld regions, and then a weld structure is refined to obtain a plurality of detection regions, thereby facilitating independent defect determining for each detection region. In addition, when preset attribute information of at least one detection region satisfies the preset condition, it is determined that the weld has a defect. Through region analysis and specification control, when the weld defect is effectively intercepted, a misjudgment rate of the weld defect can be reduced, and detection accuracy can be improved, thereby improving the battery yield and the delivery volume.

What is claimed is:

1. A welding defect detection method, comprising:
obtaining a first image of welding between a battery top cover and a case, wherein the first image comprises structural information;
performing weld region detection in the first image, to obtain a weld region and non-weld regions;
determining an effective width and a center width of the weld region in a bead width direction;
determining, according to the effective width, a first predetermined distance and a second predetermined distance by which the weld region is expanded toward the non-weld regions in the bead width direction;
performing region division of a weld between the battery top cover and the case based on the first predetermined distance, the second predetermined distance, and the center width, to obtain a plurality of detection regions; and
determining that the weld has a defect when preset attribute information of at least one detection region in the plurality of detection regions of the weld satisfies a preset condition.

2. The welding defect detection method according to claim 1, wherein the determining an effective width of the weld region in a bead width direction comprises:
determining a first edge location and a second edge location of the weld region in the bead width direction; and
obtaining the effective width of the weld region in the bead width direction according to a difference between the second edge location and the first edge location.

3. The welding defect detection method according to claim 2, wherein the plurality of detection regions comprise an upper top cover weld region, a center bead region, and a side top cover weld region, wherein the center bead region is located between the upper top cover weld region and the side top cover weld region in the bead width direction; and the performing region division of a weld between the battery top cover and the case based on the first predetermined distance, the second predetermined distance, and the center width, to obtain a plurality of detection regions comprises:
determining a third edge location and a fourth edge location of the center bead region in the bead width direction according to the first edge location, the second edge location, the effective width, and the center width of the weld region in the bead width direction;
expanding, in the bead width direction, the first edge location by the first predetermined distance toward a non-weld region in a direction away from the center bead region, to obtain a fifth edge location of the upper top cover weld region in the bead width direction, wherein the third edge location is an edge location of the upper top cover weld region close to the center bead region in the bead width direction; and
expanding, in the bead width direction, the second edge location by the second predetermined distance toward a non-weld region in the direction away from the center bead region, to obtain a sixth edge location of the side top cover weld region in the bead width direction, wherein the fourth edge location is an edge location of the side top cover weld region close to the center bead region in the bead width direction.

4. The welding defect detection method according to claim 3, wherein the determining a third edge location and a fourth edge location of the center bead region in the bead width direction according to the first edge location, the second edge location, the effective width, and the center width of the weld region in the bead width direction comprises:
moving the first edge location by a third predetermined distance toward the second edge location, to obtain the third edge location, wherein the third predetermined distance is half a difference between the effective width and the center width; and
moving the second edge location by the third predetermined distance toward the first edge location, to obtain the fourth edge location.

5. The welding defect detection method according to claim 3, wherein the plurality of detection regions further comprise a first detection region and a second detection region, wherein the first detection region is located on first sides of the upper top cover weld region, the center bead region, and the side top cover weld region in a bead extension direction;
and the second detection region is located on second sides of the upper top cover weld region, the center bead region, and the side top cover weld region in the bead extension direction.

6. The welding defect detection method according to claim 5, wherein the obtaining a plurality of detection regions further comprises:
expanding a seventh edge location of the weld region in the bead extension direction by a fourth predetermined distance in a direction close to the upper top cover weld region, the center bead region, and the side top cover weld region, to obtain an eighth edge location of the first detection region, wherein the seventh edge location is an edge location of the first detection region in a direction away from the upper top cover weld region, the center bead region, and the side top cover weld region.

7. The welding defect detection method according to claim 5, wherein the obtaining a plurality of detection regions further comprises:
expanding a ninth edge location of the weld region in the bead extension direction by a fifth predetermined distance in the direction close to the upper top cover weld region, the center bead region, and the side top cover weld region, to obtain a tenth edge location of the second detection region, wherein the ninth edge location is an edge location of the second detection region in the direction away from the upper top cover weld region, the center bead region, and the side top cover weld region.

8. The welding defect detection method according to claim 1, wherein the method further comprises:
obtaining at least one first detection box comprising a detection target according to the first image, wherein the first detection box comprises a category;

obtaining a to-be-identified detection box according to the at least one first detection box;

determining a detection region corresponding to the to-be-identified detection box according to a location of the to-be-identified detection box in the weld; and determining at least one piece of attribute information of the detection target in the to-be- identified detection box; and the determining that the weld has a defect when preset attribute information of at least one detection region in the plurality of detection regions of the weld satisfies a preset condition comprises:

determining that the weld has a defect when at least one piece of attribute information of the detection target in at least one to-be-identified detection box of the at least one detection region is greater than or equal to a measurement threshold corresponding to a category and the detection region of the to-be-identified detection box in which the detection target is located.

9. The welding defect detection method according to claim 8, wherein the method further comprises:

before the determining a detection region corresponding to the to-be-identified detection box according to a location of the to-be-identified detection box in the weld, obtaining a second image of welding between the battery top cover and the case, wherein the second image comprises brightness information; and obtaining at least one second detection box comprising the detection target according to the second image, wherein the second detection box comprises a category; and the obtaining a to-be-identified detection box according to the at least one first detection box comprises:

obtaining the to-be-identified detection box according to the at least one first detection box and the at least one second detection box.

10. The welding defect detection method according to claim 9, wherein the obtaining at least one second detection box comprising the detection target according to the second image comprises:

obtaining at least one second suspected detection box in the second image, wherein the second suspected detection box carries a category and a probability confidence; and performing filtering on the at least one second suspected detection box based on a probability confidence threshold, to obtain the at least one second detection box.

11. The welding defect detection method according to claim 8, wherein the at least one piece of attribute information comprises a measurement distance; and the determining at least one piece of attribute information of the detection target in the to-be-identified detection box comprises:

using a cross section of a region that does not belong to the to-be-identified detection box and that is adjacent to the to-be-identified detection box as a measurement reference plane of the to-be-identified detection box; and determining a measurement distance between the detection target and the measurement reference plane of the to-be-identified detection box in which the detection target is located.

12. The welding defect detection method according to claim 8, wherein the at least one piece of attribute information comprises the measurement distance, and the plurality of detection regions comprise the upper top cover weld region, the center bead region, and the side top cover weld region, wherein the center bead region is located between the upper top cover weld region and the side top cover weld region in the bead width direction; and the determining at least one piece of attribute information of the detection target in the to-be-identified detection box comprises:

when the to-be-identified detection box in which the detection target is located is located in the upper top cover weld region, using, according to a pixel distribution difference in the first image, a cross section of a non-weld region closest to the upper top cover weld region in the bead width direction as the measurement reference plane of the to-be-identified detection box in which the detection target is located; or when the to-be-identified detection box in which the detection target is located is located in the side top cover weld region, using, according to a pixel distribution difference in the first image, a cross section of a non-weld region closest to the side top cover weld region in the bead width direction as the measurement reference plane of the to-be-identified detection box in which the detection target is located; or when the to-be-identified detection box in which the detection target is located is located in the center bead region, using a cross section of the center bead region except the detection target as the measurement reference plane of the to-be-identified detection box in which the detection target is located; and determining the measurement distance between the detection target and the measurement reference plane of the to-be-identified detection box in which the detection target is located.

13. The welding defect detection method according to claim 12, wherein the plurality of detection regions further comprise the first detection region and the second detection region, wherein the first detection region is located on the first sides of the upper top cover weld region, the center bead region, and the side top cover weld region in the bead extension direction;

and the second detection region is located on the second sides of the upper top cover weld region, the center bead region, and the side top cover weld region in the bead extension direction;

and the determining at least one piece of attribute information of the detection target in the to-be- identified detection box comprises:

when the to-be-identified detection box in which the detection target is located is located in the first detection region, using a cross section of the first detection region except the detection target as the measurement reference plane of the to-be-identified detection box in which the detection target is located; or when the to-be-identified detection box in which the detection target is located is located in the second detection region, using a cross section of the second detection region except the detection target as the measurement reference plane of the to-be-identified detection box in which the detection target is located; and determining the measurement distance between the detection target and the measurement reference plane of the to-be-identified detection box in which the detection target is located.

14. The welding defect detection method according to claim 8, wherein the at least one piece of attribute information further comprises area information; and the determining at least one piece of attribute information of the detection target in the to-be-identified detection box further comprises:

determining pixels corresponding to the detection target according to depth information of pixels in the first image; and determining the area information of the detection target according to the pixels corresponding to the detection target in the first image.

15. The welding defect detection method according to claim 8, wherein the obtaining at least one first detection box comprising a detection target comprises:

obtaining at least one first suspected detection box in the first image, wherein the first suspected detection box comprises a category and a probability confidence; and performing filtering on the at least one first suspected detection box based on a probability confidence threshold, to obtain the at least one first detection box.

16. The welding defect detection method according to claim 8, wherein the method further comprises:

setting a measurement threshold for the attribute information of the detection target in the to-be-identified detection box according to the category and the detection region of the to-be- identified detection box.

17. A welding defect detection apparatus, comprising:

a memory; and a processor coupled to the memory, wherein the memory has stored therein processor-readable instructions which, when executed by the processor, cause the processor to perform the welding defect detection method according to claim 1.

18. A non-transitory computer-readable storage medium, storing computer program instructions, wherein the instructions, when executed by a processor, implement the welding defect detection method according to claim 1.

19. A welding defect detection apparatus, comprising:

an image obtaining module, configured to obtain a first image of welding between a battery top cover and a case, wherein the first image comprises structural information;

a first division module, configured to perform weld region detection in the first image, to obtain a weld region and non-weld regions;

a second division module, configured to determine an effective width and a center width of the weld region in a bead width direction; determine, according to the effective width, a first predetermined distance and a second predetermined distance by which the weld region is expanded toward the non-weld regions in the bead width direction; and perform region division of a weld between the battery top cover and the case based on the first predetermined distance, the second predetermined distance, and the center width, to obtain a plurality of detection regions; and a defect identification module, configured to determine that the weld has a defect when preset attribute information of at least one detection region in the plurality of detection regions of the weld satisfies a preset condition.

* * * * *